United States Patent
Park (10) Patent No.: US 10,089,539 B2
(45) Date of Patent: Oct. 2, 2018

(54) REAR-VIEW CAMERA SYSTEM FOR VEHICLE

(71) Applicant: University-Industry Foundation, Yonsei University, Seoul (KR)

(72) Inventor: Seung Han Park, Seoul (KR)

(73) Assignee: University-Industry Foundation, Yonsei University, Seoul (KR)

( * ) Notice: Subject to any disclaimer, the term of this patent is extended or adjusted under 35 U.S.C. 154(b) by 86 days.

(21) Appl. No.: 15/228,011

(22) Filed: Aug. 4, 2016

(65) Prior Publication Data

US 2017/0039437 A1    Feb. 9, 2017

(30) Foreign Application Priority Data

Aug. 6, 2015 (KR) ........................ 10-2015-0110860

(51) Int. Cl.
*B60R 1/00* (2006.01)
*G06K 9/00* (2006.01)
*H04N 5/232* (2006.01)

(52) U.S. Cl.
CPC ............ *G06K 9/00805* (2013.01); *B60R 1/00* (2013.01); *H04N 5/23296* (2013.01); *B60R 2300/70* (2013.01)

(58) Field of Classification Search
CPC .............................. G06K 9/00805; B60R 1/00
See application file for complete search history.

(56) References Cited

U.S. PATENT DOCUMENTS

| | | | | |
|---|---|---|---|---|
| 5,670,935 A * | 9/1997 | Schofield | ............... | B60N 2/002 340/461 |
| 6,734,911 B1 * | 5/2004 | Lyons | ..................... | G01S 3/781 348/169 |
| 6,891,563 B2 * | 5/2005 | Schofield | .................. | B60R 1/00 348/143 |
| 7,069,128 B2 * | 6/2006 | Iwama | ............... | B62D 15/0245 340/932.2 |
| 8,218,007 B2 * | 7/2012 | Lee | ........................... | B60R 1/00 340/932.2 |
| 8,618,955 B2 * | 12/2013 | Baker | .................... | B60Q 9/006 340/932.2 |
| 8,643,724 B2 * | 2/2014 | Schofield | .................. | B60R 1/00 348/148 |

(Continued)

FOREIGN PATENT DOCUMENTS

| | | |
|---|---|---|
| JP | 8301010 A | 11/1996 |
| JP | 200653172 A | 2/2006 |
| JP | 2010263412 A | 11/2010 |

*Primary Examiner* — Jayanti K Patel
*Assistant Examiner* — Irfan Habib
(74) *Attorney, Agent, or Firm* — The Webb Law Firm (57) ABSTRACT

Disclosed is a rear-view camera system for a vehicle. The rear-view camera system for a vehicle according to one embodiment of the present invention includes at least one wide-angle lens and at least one standard lens, and may take a rear image of the vehicle using the wide-angle lens or the standard lens. According to the embodiment of the present invention, it is possible to reduce an accident risk, while the vehicle is reversing, by providing an image taken through the wide-angle lens or an image taken through the standard lens according to a distance between the vehicle and an object located at a rear thereof or a user's selection, and also to observe rules of parking etiquette without any difficulty.

8 Claims, 7 Drawing Sheets

(56) References Cited

U.S. PATENT DOCUMENTS

| | | | |
|---|---|---|---|
| 8,937,558 B2* | 1/2015 | Ozaki | B60R 1/00 |
| | | | 340/425.5 |
| 9,047,779 B2* | 6/2015 | Inoue | B60R 1/00 |
| 9,085,261 B2* | 7/2015 | Lu | B60D 1/245 |
| 9,315,151 B2* | 4/2016 | Taylor | B60R 1/00 |
| 9,340,156 B2* | 5/2016 | O'Cualain | B60R 1/00 |
| 9,342,747 B2* | 5/2016 | Kuehnle | G06K 9/00805 |
| 9,446,713 B2* | 9/2016 | Lu | B60R 1/002 |
| 9,758,099 B2* | 9/2017 | VanVuuren | B60R 1/002 |
| 9,809,168 B2* | 11/2017 | Taylor | B60R 1/00 |
| 2002/0167589 A1* | 11/2002 | Schofield | B60N 2/002 |
| | | | 348/148 |
| 2003/0122930 A1* | 7/2003 | Schofield | B60R 1/00 |
| | | | 348/148 |
| 2006/0069478 A1* | 3/2006 | Iwama | B62D 15/0245 |
| | | | 701/36 |
| 2009/0079828 A1* | 3/2009 | Lee | B60R 1/00 |
| | | | 348/148 |
| 2012/0062743 A1* | 3/2012 | Lynam | B60Q 9/005 |
| | | | 348/148 |
| 2012/0140080 A1* | 6/2012 | Taylor | B60C 23/0408 |
| | | | 348/148 |
| 2016/0059782 A1* | 3/2016 | Karner | B29C 45/0017 |
| | | | 348/148 |
| 2016/0075373 A1* | 3/2016 | Fukukawa | B62D 1/28 |
| | | | 701/42 |
| 2017/0032680 A1* | 2/2017 | Imai | G08G 1/168 |
| 2017/0232890 A1* | 8/2017 | Lewis | B60Q 9/002 |
| | | | 348/148 |
| 2018/0154900 A1* | 6/2018 | Lee | B60W 30/08 |

* cited by examiner

REAR-VIEW CAMERA SYSTEM FOR VEHICLE

CROSS-REFERENCE TO RELATED APPLICATION

This application claims priority to Korean Patent Application No. 10-2015-0110860 filed Aug. 6, 2015, the disclosure of which is hereby incorporated in its entirety by reference.

TECHNICAL FIELD

The present invention relates to a rear-view camera system for a vehicle, and more particularly, to a rear-view camera system for a vehicle, which provides an image taken through a wide-angle lens or an image taken through a standard lens.

BACKGROUND ART

When a driver turns a traveling direction of a vehicle to left or right during driving of the vehicle, the driver checks a left rear and a right rear through a left side mirror and a right side mirror. However, when the driver intends to check left and right blind spots which are not visible through the left and right side mirrors, the driver has to put his/her head out of a window and then to check the blind spots, and such a situation occurs more often when the vehicle is reversing. To improve the problems, recently, there has been proposed a camera installed at a rear side of the vehicle, and the camera allows the driver to easily park the vehicle by providing a rear image of the vehicle. Meanwhile, a wide-angle lens is applied to such a rear-view camera to ensure a wide view. However, since the wide-angle lens provides a distorted image having exaggerated perspective or the like due to characteristics thereof, it is difficult to exactly recognize an object located at a rear of the vehicle using only the image taken through the wide-angle lens.

DISCLOSURE

Technical Problem

The present invention is directed to providing a rear-view camera system for a vehicle, which is able to reduce an accident risk, while the vehicle is reversing, by providing an image taken through a wide-angle lens or an image taken through a standard lens according to a distance between the vehicle and an object located at a rear thereof or a user' selection.

Technical Solution

One aspect of the present invention provides a rear-view camera system for a vehicle including at least one wide-angle lens and at least one standard lens, wherein a rear image of the vehicle is taken using the wide-angle lens or the standard lens.

The rear-view camera system may further include an optical member which distributes light indicating an image of an object to the wide-angle lens and the standard lens.

The rear-view camera system may further include an optical member which transmits light indicating an image of an object to one of the wide-angle lens and the standard lens.

The optical member may switch the wide-angle lens and the standard lens by rotation thereof.

The image taken through one of the wide-angle lens and the standard lens may be output according to a user's selection.

The image taken through the wide-angle lens may be output when the distance between the vehicle and an object located at a rear of the vehicle is greater than a preset distance, and the image taken through the standard lens may be output when the distance between the vehicle and the object located at the rear of the vehicle is smaller than the preset distance.

The image taken through one of the wide-angle lens and the standard lens may be processed by a software correction, and then may be output to a display device.

Another aspect of the present invention provides a rear-view camera system for a vehicle, in which a rear image of the vehicle is taken using a combined lens of which a center portion has a standard lens shape and an edge thereof has a wide-angle lens shape.

A standard image taken through the center portion of the combined lens and a wide-angle image taken through the edge of the combined lens may be processed by a software correction, and then may be output to a display device.

Advantageous Effects

According to an exemplary embodiment of the present invention, it is possible to reduce an accident risk, while the vehicle is reversing, by providing an image taken through a wide-angle lens or an image taken through a standard lens according to a distance between the vehicle and an object located at a rear thereof or a user's selection, and also to observe rules of parking etiquette.

MODES OF THE INVENTION

Although the present invention can have various embodiments, specific exemplary embodiments are illustrated in the accompanying drawings and will be described in detail in the detailed description. However, the present invention is not limited to the embodiments, and it should be understood that the present invention comprises all of modifications included in the technical scope and spirit of the invention.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, preferred embodiments of the present invention will be described, but the description of well-known configuration, unrelated to the subject matter of the present invention, will be omitted. Meanwhile, in the drawings, the same components are designated by the same reference numerals, even though they are depicted in different drawings.

Figure 1:
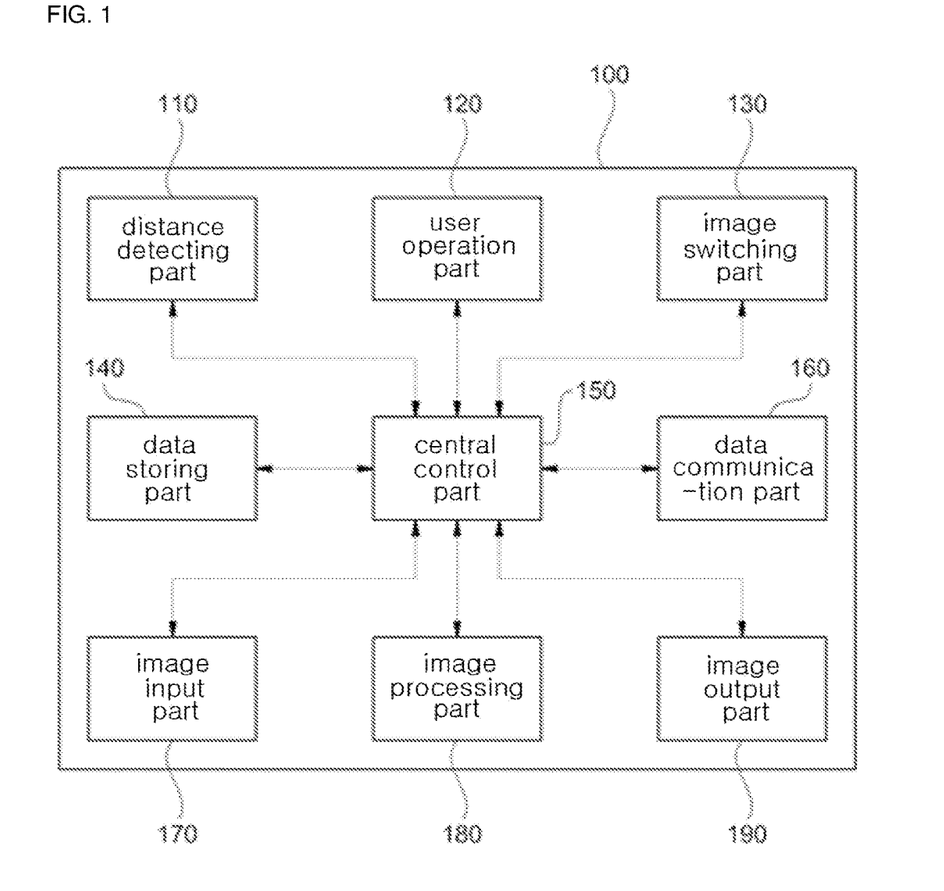
FIG. 1 is a block diagram illustrating a configuration of a rear-view camera system for a vehicle according to one embodiment of the present invention.

FIG. 1 is a block diagram illustrating a configuration of a rear-view camera system for a vehicle according to one embodiment of the present invention.

Referring to FIG. 1, a rear-view camera system 100 for a vehicle according to one embodiment of the present invention may include a distance detecting part 110, a user operation part 120, an image switching part 130, a data storing part 140, a data communication part 160, an image input part 170, an image processing part 180 and an image output part 190, and these parts may be controlled by a central control part 150.

The distance detecting part 110 serves to detect a distance between a vehicle and an object located at a rear of the vehicle through a distance detecting sensor or the like using ultrasonic waves or infrared rays. The user operation part 120 serves to manually receive an image switching signal from a user, may include a button, a keypad, a touch screen panel (TSP), a mike and so on and may further include various human interface devices (HIDs).

The image switching part 130 serves to switch between an image taken through a wide-angle lens and an image taken through a standard lens according to the distance between the vehicle and the object located at the rear thereof or a user's selection and may include an optical member which controls a path of light indicating an image of the object. For example, when the distance between the vehicle and the object located at the rear thereof is greater than a preset distance, the image taken through the wide-angle lens may be selected, and when the distance is smaller than the preset distance, the image taken through the standard lens may be selected.

Alternatively, the image switching part 130 may switch and output the image taken through the wide-angle lens and the image taken through the standard lens according to a steering direction of a steering apparatus by controlling of the central control part 150. The image switching part 130 may determine an operation direction of the steering apparatus interlocked with a steering operation mechanism such as a steering wheel, may select and output the image taken through the standard lens when the object is located within the preset distance in the operation direction of the steering apparatus and may select and output the image taken through the wide-angle lens when the object is not located within the preset distance in the operation direction of the steering apparatus. For example, when the vehicle reverses, the image taken using the wide-angle lens is selected and output, and when the operation direction of the steering apparatus is changed by an operation of the vehicle steering wheel, the distance detecting part 110 determines whether the object is located in the operation direction of the steering apparatus, and the image taken through the standard lens is output when the object is located within the preset distance in the operation direction of the steering apparatus. That is, the image through the wide-angle lens and the image through the standard lens may be switched and output according to whether or not the object is located in a direction in which the vehicle is intended to reverse and the distance between the corresponding object and a tail end of the vehicle. Therefore, a driver may receive an image having a wide view through the wide-angle lens when the object is not located in a traveling direction while the vehicle reverses and may receive a non-distorted image through the standard lens when the object located in the traveling direction comes within the preset distance.

The data storing part 140 may include various memory devices, a hard disk drive (HDD), a solid state drive (SSD) and so on which may store data processed in the central control part 150. The central control part 150 may be configured with a central processing unit (CPU), a microprocessor unit (MPU), an application processor (AP), a digital signal processor (DSP) or the like.

The data communication part 160 serves to receive and transmit data to/from an external device (not shown), e.g., a user terminal and may include one or more of a wire network module and a wireless network module. The wire network module may include local area network (LAN), universal serial bus (USB), Ethernet, power line communication (PLC) and so on, and the wireless network module may include a wireless LAN, infrared data association (IrDA), code division multiple access (CDMA), time division multiple access (TDMA), frequency division multiple access (FDMA), long term evolution (LTE), wireless broadband Internet (WiBro), high speed downlink packet access (HSDPA), wideband CDMA (WCDMA), ultra wideband (UWB), ubiquitous sensor network (USN), radio frequency identification (RFID), near field communication (NFC), Zigbee, Bluetooth and so on.

The image input part 170 serves to receive a rear image of the vehicle taken through a camera provided with the wide-angle lens and the standard lens. The image processing part 180 serves to perform a software correction of the image taken through the camera, may measure and digitize a distorted degree of the image and may correct the distorted image to be the same as an actual ratio using various image processing algorithms. At this point, the image processing part 180 may process the image input from the image input part 170 in different methods from each other according to the used lenses.

The image output part 190 serves to output the image input from the image input part 170 to a display device and may include a liquid crystal display (LCD), an organic light emitting diode (OLED), a plasma display panel (PDP), a field emission display (FED) and so on.

Figure 2:
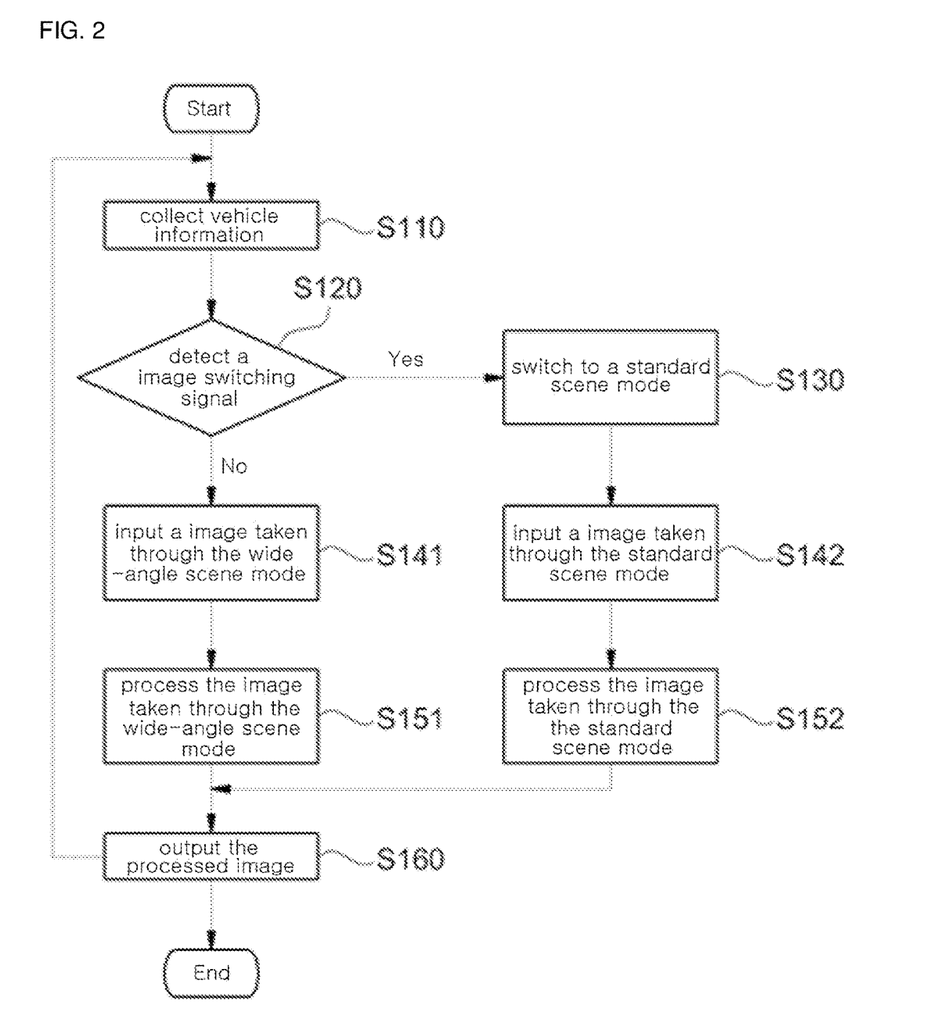
FIG. 2 is a flowchart illustrating a method of operating the rear-view camera system for a vehicle according to one embodiment of the present invention.

FIG. 2 is a flowchart illustrating a method of operating the rear-view camera system for a vehicle according to one embodiment of the present invention.

Referring to FIG. 2, vehicle information including the distance between the vehicle and the object located at the rear thereof is collected (an operation S110), and it is confirmed whether or not a signal requesting a switch to the image taken through the standard lens is generated (an operation S120). At this point, a standard image switching signal may be generated when the distance between the vehicle and the object located at the rear thereof is smaller than the preset distance or by a user's request. Alternatively, the standard image switching signal may be generated when the distance between the object located in the operation direction of the steering apparatus of the vehicle and the tail end of the vehicle is smaller than the preset distance.

Here, when the standard image switching signal is detected, it is switched to a scene mode through the standard lens using the optical member which controls the path of the light indicating the image of the object (an operation S130). Then, after the image taken through the standard lens is input (an operation S142), the input image is processed using a correction algorithm according to a standard scene mode (an operation S152).

Meanwhile, when the standard image switching signal is not detected, the image taken through the wide-angle lens is input (an operation S141), and the input image is processed using a correction algorithm according to a wide-angle scene mode (an operation S151). Then, the image processed in the operation S151 or S152 is output to the display device (an operation S160).

Figure 3:
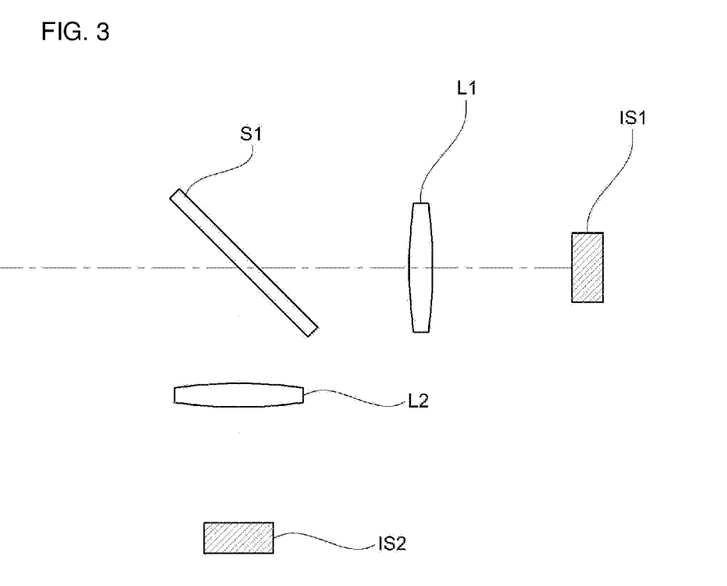
FIG. 3 is a cross-sectional view illustrating a partial configuration of a rear-view camera for a vehicle according to a first embodiment of the present invention.

FIG. 3 is a cross-sectional view illustrating a partial configuration of a rear-view camera for a vehicle according to a first embodiment of the present invention.

Referring to FIG. 3, the rear-view camera for a vehicle according to the first embodiment of the present invention may include at least one wide-angle lens L1, at least one standard lens L2, a first image sensor IS1 which converts the light passed through the wide-angle lens L1 into an electric signal, a second image sensor IS2 which converts the light passed through the standard lens L2 into the electric signal, and an optical member S1 which distributes the light indicating the image of the object to the wide-angle lens L1 and the standard lens L2, and may take the rear image of the vehicle.

The wide-angle lens L1 is a lens of which a focal length is shorter than a diagonal length of a screen in the camera, provides a view angle wider than that of the standard lens L2, thus may capture a wider range on the screen even when an image is captured in the same distance but has a characteristic, such as exaggerated perspective, in which the image is distorted. On the contrary, the standard lens L2 is a lens of which the focal length is similar to the diagonal length of the screen in the camera, provides the view angle narrower than that of the wide-angle lens L1 but may take the image to be the most similar to a person's view.

Meanwhile, the first image sensor IS1 and the second image sensor IS2 may be a complementary metal-oxide semiconductor (CMOS) image sensor or a charge coupled device (CCD) image sensor, and the optical member S1 may distribute the light indicating the image of the object by passing some of the light and reflecting the remaining thereof.

Figure 4A:
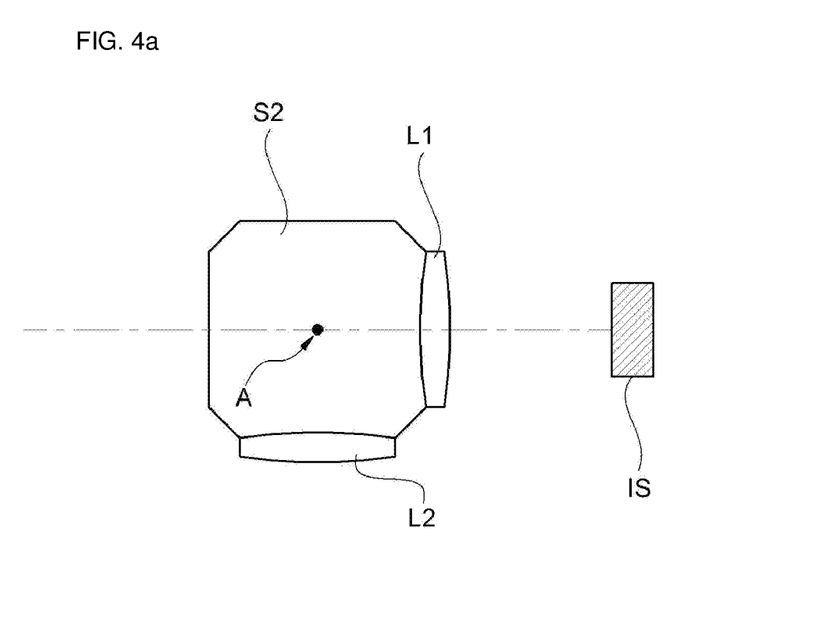
FIGS. 4a and 4b are cross-sectional views illustrating a partial configuration of a rear-view camera for a vehicle according to a second embodiment of the present invention.
Figure 4B:
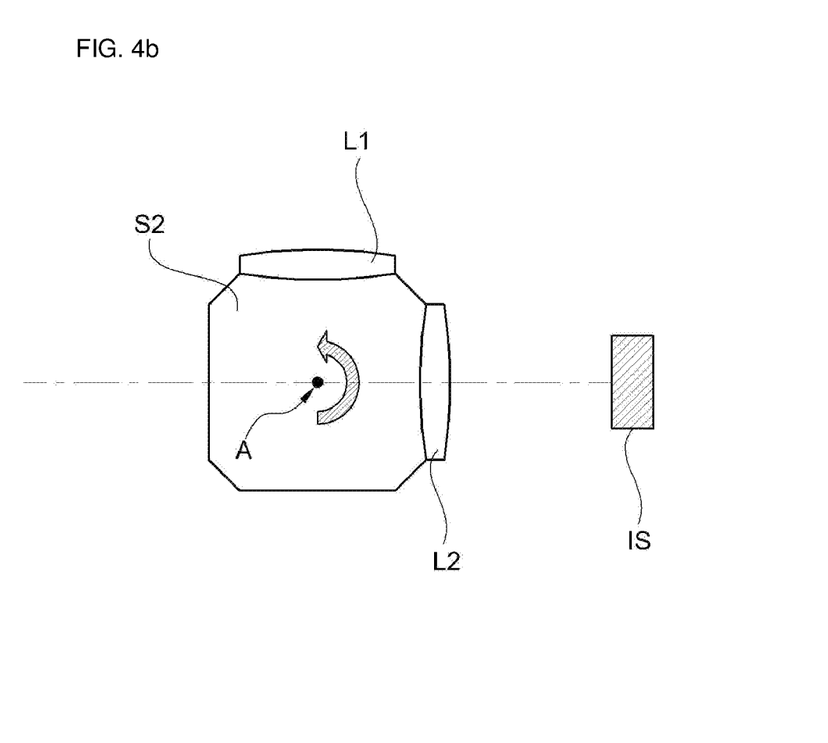

FIGS. 4*a* and 4*b* are cross-sectional views illustrating a partial configuration of a rear-view camera for a vehicle according to a second embodiment of the present invention. In the description of the embodiment, detailed description of the substantially same parts as those in the above-described first embodiment will be omitted.

Referring to FIGS. 4*a* and 4*b*, the rear-view camera for a vehicle according to the second embodiment of the present invention may include at least one wide-angle lens L1, at least one standard lens L2, an image sensor IS which converts the light passed through the wide-angle lens L1 or the standard lens L2 into an electric signal, and an optical member S2 which transmits the light indicating the image of the object to one of the wide-angle lens L1 and the standard lens L2.

The optical member S2 may switch the wide-angle lens L1 or the standard lens L2 by rotation. Specifically, the wide-angle lens L1 or the standard lens L2 may be fixed to the optical member S2 to be spaced apart from each other at a predetermined angle, and one of the wide-angle lens L1 and the standard lens L2 may coincide with an optical axis by rotating the optical member S2 at the predetermined angle.

Figure 5A:
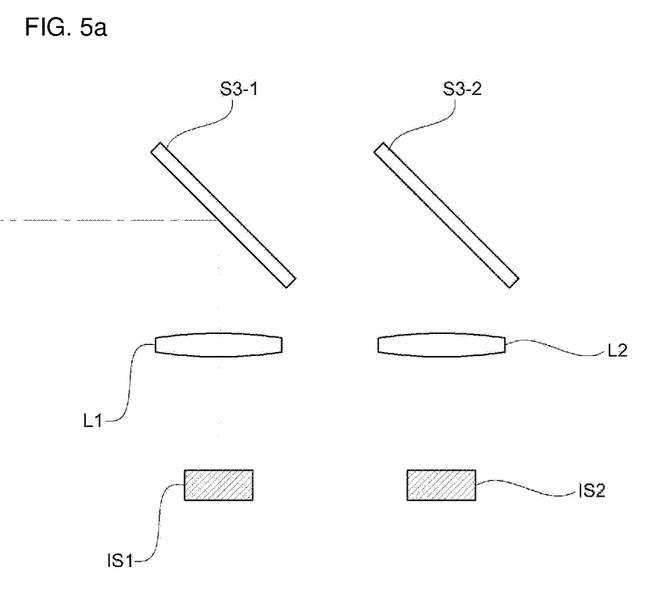
FIGS. 5a and 5b are cross-sectional views illustrating a partial configuration of a rear-view camera for a vehicle according to a third embodiment of the present invention.
Figure 5B:
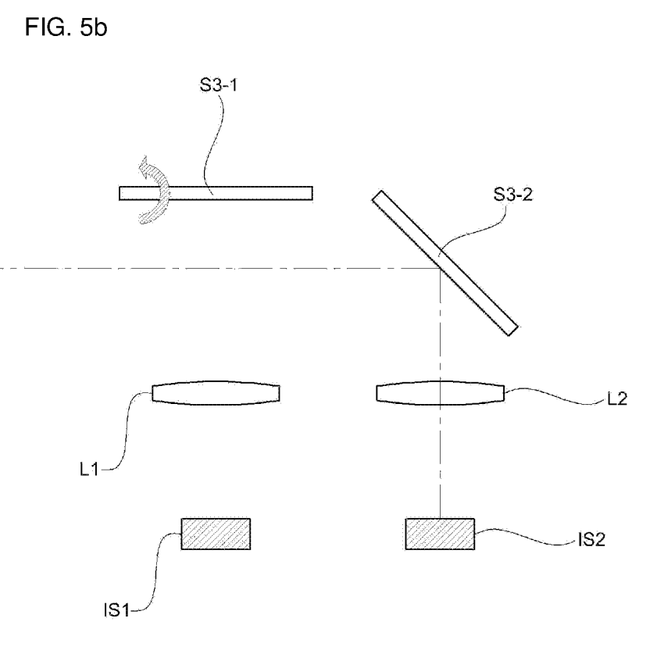

FIGS. 5*a* and 5*b* are cross-sectional views illustrating a partial configuration of a rear-view camera for a vehicle according to a third embodiment of the present invention. In the description of the embodiment, detailed description of the substantially same parts as those in the above-described first embodiment will be omitted.

Referring to FIGS. 5*a* and 5*b*, the rear-view camera for a vehicle according to the third embodiment of the present invention may include at least one wide-angle lens L1, at least one standard lens L2, a first image sensor IS1 which converts the light passed through the wide-angle lens L1 into an electric signal, a second image sensor IS2 which converts the light passed through the standard lens L2 into the electric signal, and one pair of optical members S3-1 and S3-2 which transmit the light indicating the image of the object to one of the wide-angle lens L1 and the standard lens L2.

The optical members S3-1 and S3-2 may include a reflecting plate like a mirror and may switch the wide-angle lens L1 or the standard lens L2 by rotation thereof. Specifically, the light may be reflected by one of the pair of optical members S3-1 and S3-2 according to an angle of each of the optical members S3-1 and S3-2 and then may be transmitted to the wide-angle lens L1 or the standard lens L2.

Figure 6:
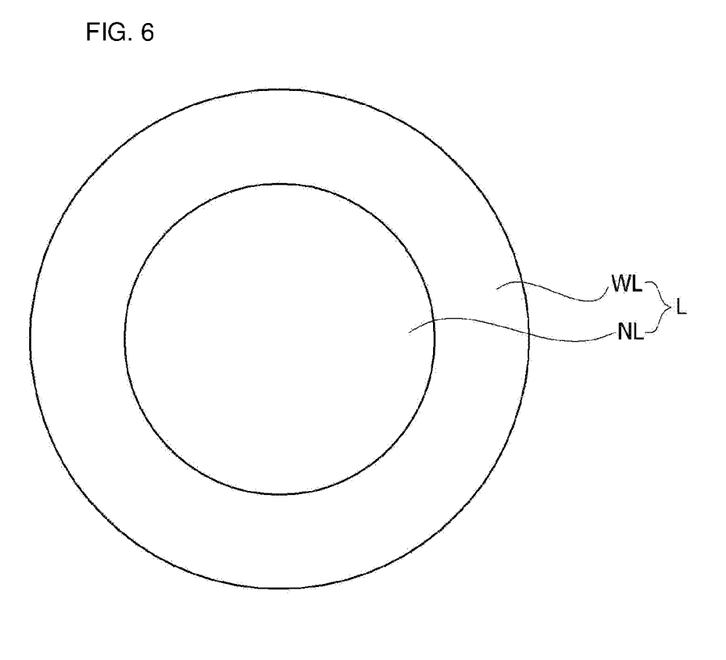
FIG. 6 is a cross-sectional view illustrating a partial configuration of a rear-view camera for a vehicle according to a fourth embodiment of the present invention.

FIG. 6 is a cross-sectional view illustrating a partial configuration of a rear-view camera for a vehicle according to a fourth embodiment of the present invention. In the description of the embodiment, detailed description of the substantially same parts as those in the above-described first embodiment will be omitted.

Referring to FIG. 6, the rear-view camera for a vehicle according to the fourth embodiment of the present invention may take the rear image of the vehicle using a combined lens L of which a center portion NL has a standard lens shape and an edge WL has a wide-angle lens shape. At this point, the software correction of the standard image taken through the center portion of the combined lens L and the wide-angle image taken through the edge of the combined lens L may be performed at the same time and then may be output to the display device (not shown).

Figure 7A:
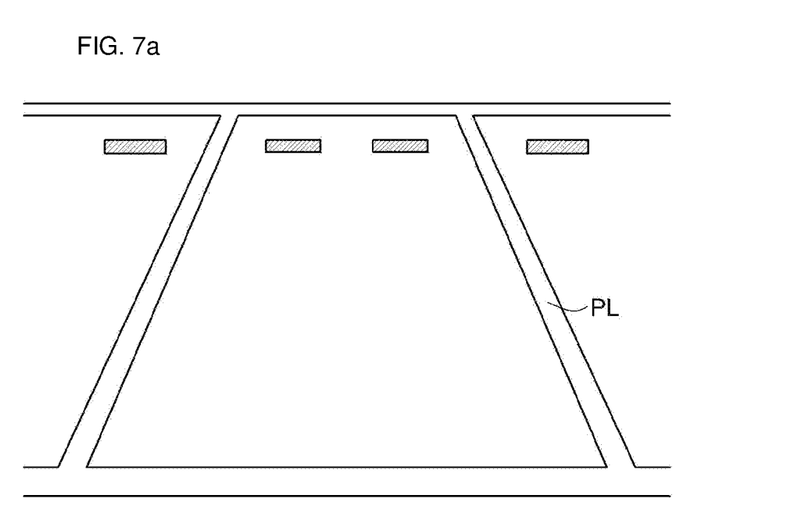
FIGS. 7a and 7b are views illustrating an image taken through the rear-view camera for a vehicle according to one embodiment of the present invention.
Figure 7B:
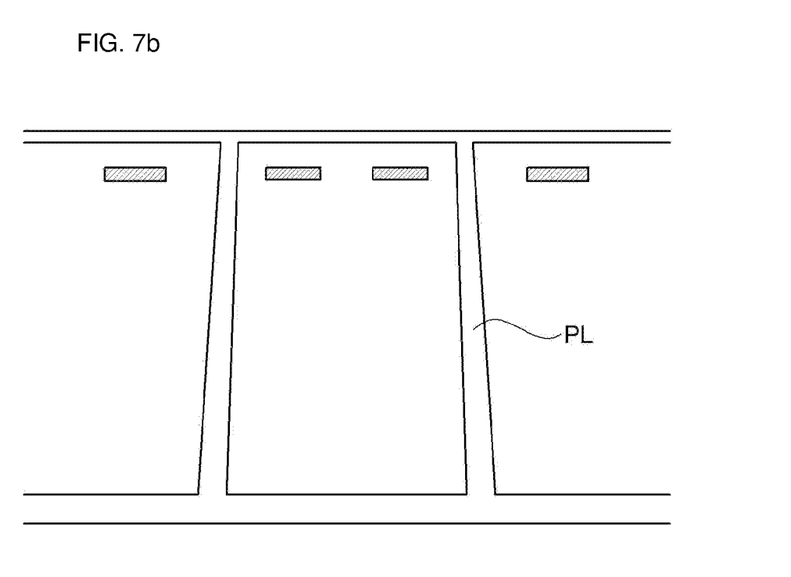

FIGS. 7a and 7b are views illustrating an image taken through the rear-view camera for a vehicle according to one embodiment of the present invention.

Referring to FIGS. 7a and 7b, the rear-view camera system for a vehicle according to one embodiment of the present invention may output an image a taken through the wide-angle lens when the distance between the vehicle and the object located at the rear thereof is greater than the preset distance and may output an image b taken through the standard lens when the distance is smaller than the preset distance. However, the present invention is not limited thereto. A rear-view camera system for a vehicle according to another embodiment of the present invention may output one of the image a taken through the wide-angle lens and the image b taken through the standard lens according to the user's selection.

Here, the image a taken through the wide-angle lens or the image b taken through the standard lens is provided to a user through a separate image processing, and since the image a taken through the wide-angle lens applied to ensure a wide view has an exaggerated perspective even after the image processing and thus the image distortion in which a rectangular parking line PL looks like a trapezoidal shape is severe, it is difficult to exactly recognize the object located at the rear of the vehicle. However, the rear-view camera system for a vehicle according to one embodiment of the present invention may additionally provide the image b taken through the standard lens which is the most similar to a person's view and may thus reduce an accident risk while the vehicle is reversing.

According to the rear-view camera system for a vehicle according to one embodiment of the present invention, it is possible to reduce the accident risk, while the vehicle is reversing, by providing the image taken through the wide-angle lens or the image taken through the standard lens according to the distance between the vehicle and the object located at the rear thereof or the user's selection, and also to observe rules of parking etiquette.

The term "part", as used herein, means, but is not limited to, a software or hardware component, such as a field programmable gate array (FPGA) or an application specific integrated circuit (ASIC), which performs certain tasks. A part can advantageously be configured to reside in an addressable storage medium and configured to execute on one or more processors. Thus, the part can include, by way of example, components, such as software components, object-oriented software components, class components and task components, processes, functions, attributes, procedures, subroutines, segments of program code, drivers, firmware, microcode, circuitry, data, databases, tables, arrays, and variables.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A rear-view camera system for a vehicle, comprising:
a rear-view camera configured to take a rear image of the vehicle using at least one wide-angle lens and at least one standard lens;
a distance detecting part configured to detect a distance between the vehicle and an object located at a rear of the vehicle; and
a central control part configured to switch and output an image taken through the wide-angle lens or an image taken through the standard lens according to the distance between the vehicle and the object located at the rear of the vehicle,
wherein the central control part determines an operation direction of a steering apparatus of the vehicle interlocked with a steering wheel of the vehicle,
wherein the central control part outputs an image taken through the wide-angle lens when the distance between the vehicle and the object located in a steering direction of the vehicle is greater than a preset distance, and
wherein the central control part outputs an image taken through the standard lens when the distance between the vehicle and the object located in the steering direction of the vehicle is smaller than the preset distance.

2. The system of claim 1, wherein the rear-view camera further includes an optical member which distributes light indicating an image of an object to the wide-angle lens and the standard lens.

3. The system of claim 1, wherein the rear-view camera further includes an optical member which transmits light indicating an image of an object to one of the wide-angle lens and the standard lens.

4. The system of claim 3, wherein the optical member switches the wide-angle lens and the standard lens by rotation thereof.

5. The system of claim 1, further comprising a user operation part which receives a signal for outputting the image taken through one of the wide-angle lens and the standard lens.

6. The system of claim 1, wherein the central control part outputs the image taken through the wide-angle lens when the distance between the vehicle and the object located at the rear of the vehicle is greater than the preset distance, and outputs the image taken through the standard lens when the distance between the vehicle and the object located at the rear of the vehicle is smaller than the preset distance.

7. The system of claim 1, wherein the image taken through one of the wide-angle lens and the standard lens is processed by a software correction, and then output to a display device.

8. The system of claim 1, wherein a center portion of the rear-view camera has a standard lens shape and an edge thereof has a wide-angle lens shape.

* * * * *